United States Patent
Tao et al.

(10) Patent No.: US 11,902,931 B2
(45) Date of Patent: Feb. 13, 2024

(54) METHOD AND APPARATUS FOR TRANSMITTING POSITIONING MEASUREMENT REPORT

(71) Applicant: Nokia Technologies Oy, Espoo (FI)

(72) Inventors: Tao Tao, Shanghai (CN); Jianguo Liu, Shanghai (CN); Zhe Luo, Shanghai (CN); Yan Meng, Shanghai (CN); Zhilan Xiong, Bristol (GB)

(73) Assignee: Nokia Technologies Oy, Espoo (FI)

(*) Notice: Subject to any disclaimer, the term of this patent is extended or adjusted under 35 U.S.C. 154(b) by 395 days.

(21) Appl. No.: 17/292,064

(22) PCT Filed: Nov. 9, 2018

(86) PCT No.: PCT/CN2018/114773
§ 371 (c)(1),
(2) Date: May 7, 2021

(87) PCT Pub. No.: WO2020/093358
PCT Pub. Date: May 14, 2020

(65) Prior Publication Data
US 2021/0400620 A1    Dec. 23, 2021

(51) Int. Cl.
*H04W 64/00* (2009.01)
*H04W 4/02* (2018.01)
*H04W 24/10* (2009.01)

(52) U.S. Cl.
CPC ......... *H04W 64/003* (2013.01); *H04W 4/025* (2013.01); *H04W 24/10* (2013.01)

(58) Field of Classification Search
CPC .... H04W 64/00; H04W 64/003; H04W 24/10
See application file for complete search history.

(56) References Cited

U.S. PATENT DOCUMENTS

| 2010/0323719 A1 | 12/2010 | Jen | 455/456.1 |
| 2010/0323720 A1* | 12/2010 | Jen | H04W 64/00 455/456.1 |

(Continued)

FOREIGN PATENT DOCUMENTS

| CN | 101292446 A | 10/2008 |
| CN | 103200610 A | 7/2013 |

(Continued)

OTHER PUBLICATIONS

3GPP TS 36.133 V 15.4.0, "$3^{rd}$ Generation Partnership Project; Technical Specification Group Radio Access Network; Evolved Universal Terrestrial Radio Access (E-UTRA); Requirements for support of radio resource management (Release 15), Sections 8.1.2.5.1, 8.1.2.5.2 and 8.1.2,5,3", 9 pages, Oct. 2018.

(Continued)

*Primary Examiner* — Kevin Kim
(74) *Attorney, Agent, or Firm* — Harrington & Smith

(57) ABSTRACT

Methods and apparatus for transmitting positioning measurement report are provided. The method includes a step of receiving a location information request from a serving base station or from a location server, a step of determining timing for transmitting a positioning measurement report, a step of generating a report assisted message based on the determined timing for transmitting the positioning measurement report, and a step of transmitting the report assisted message to the serving base station. The key idea of this disclosure is requesting UL resources for positioning measurement report in advance by transmitting a report assisted message. Consequently, the UE can transmit the positioning measurement report just after the measurement data being generated. The disclosure can minimize the delay from positioning measurement data generation to the positioning measurement report.

14 Claims, 5 Drawing Sheets

(56) References Cited

U.S. PATENT DOCUMENTS

| | | | |
|---|---|---|---|
| 2014/0242965 A1* | 8/2014 | Lee | H04W 64/00 |
| | | | 455/418 |
| 2015/0208262 A1 | 7/2015 | Siomina | 24/10 |
| 2016/0195601 A1 | 7/2016 | Siomina et al. | 5/10 |
| 2016/0227373 A1 | 8/2016 | Tsai et al. | 4/25 |
| 2017/0006426 A1* | 1/2017 | Fu | G01S 5/0236 |
| 2017/0272987 A1* | 9/2017 | Han | H04W 36/08 |
| 2017/0276761 A1 | 9/2017 | Park et al. | 5/257 |
| 2017/0289831 A1 | 10/2017 | Park et al. | 24/8 |

FOREIGN PATENT DOCUMENTS

| | | | |
|---|---|---|---|
| CN | 103621138 A | | 3/2014 |
| CN | 106461748 A | | 2/2017 |
| EP | 3826385 A1 * | 5/2021 | ............ H04W 64/00 |
| WO | WO 2018/084764 A1 | | 5/2018 |

OTHER PUBLICATIONS

3GPP TSG-RAN WG4 Meeting #89, Spokane, US, Nov. 12-16, 2018, R4-1815147, "Correction on inter-RAT measurement in TS 38.133", Huawei, HiSilicon, 12 pgs.

3GPP TSG RAN Meeting #80, La Jolla, USA, Jun. 11-14, 2018, RP-181399, "New SID: Study in NR positioning support", Intel Corporation, Ericsson, 6 pgs.

\* cited by examiner

METHOD AND APPARATUS FOR TRANSMITTING POSITIONING MEASUREMENT REPORT

CROSS REFERENCE TO RELATED APPLICATION

This patent application is a U.S. National Stage application of International Patent Application Number PCT/CN2018/114773 filed Nov. 9, 2018, which is hereby incorporated by reference in its entirety.

FIELD OF THE INVENTION

The present disclosure relates to a technique for transmitting positioning measurement report.

BACKGROUND OF THE INVENTION

3GPP new study item (SI) "Study on NR (New Radio) Positioning Support" has been agreed in RP-181399. In this SI, NR shall not only support regulatory positioning requirements but also commercial positioning use cases. According to the justification part in this SI description, NR design targeting for commercial positioning use cases includes at least the support of accuracy and latency as defined in TR 22.862 for some use cases.

The 3GPP TR 22.872 complements existing work on 5G use cases involving positioning needs in order to identify potential requirements for 5G positioning services. For some use cases (e.g., machine control), there will be stringent latency requirement for positioning service. As analyzed in 22.872, time-related KPIs for positioning include:

Time to First Fix (TTFF): time elapsed between the event triggering for the first time the determination of the position-related data and the availability of the position-related data at the positioning system interface. TTTF is greater or equal to Latency.

Update rate: the rate at which the position-related data is generated by the positioning system. It is the inverse of the time elapsed between two successive position-related data.

Latency: time elapsed between the event that triggers the determination of the position-related data and the availability of the position-related data at the positioning system interface. At initialisation of the positioning system, the latency is also defined as the Time to First Fix.

These time-related KPI (Key Performance Indicator)s related to the location server and measurement point become TTFF_RAN (Radio Access Network): The time elapsed between the location server sending the location information/request and receiving the first whole position-related data for UE (user equipment) positioning purpose.

Update_Time_RAN: The time elapsed between two successive whole position-related data received by the location server.

Latency_RAN: The time elapsed between the location server receiving the position-related data from the measurement point and the measurement point generating a measurement position-related data. At initialisation of the positioning system, the latency is also defined as the TTFF_RAN.

Measurement_Time_RAN: The time to complete the position-related data measurement at the measurement point.

The above-mentioned time-related KPIs for NR positioning are illustrated in FIG. 1.

So how to reduce some latency components in "latency_RAN" to meet stringent latency requirement in some positioning use cases is the problem to be solved.

In LTE system, the report event for positioning measurement from a UE to a location server by LPP (LTE positioning protocol) is transparent to the serving base station. The nature of transparent may result in some latencies for LTE positioning, especially in the procedure of positioning measurement report. Taking observed time difference of arrival (OTDOA) technology as an example, the latency of positioning measurement report in the LTE system low layer is illustrated in FIG. 2.

The whole reference signal time difference (RSTD) report procedure in low layer may include the following steps:

1. Scheduling Request Transmission

UE's MAC triggers scheduling request (SR) when RSTD data becomes available for transmission in UL (uplink). During SR procedure, the UE performs either transmission of SR over the PUCCH (Physical uplink control channel) or initiates random access procedure, depending on whether the UE has valid PUCCH resources for SR (SR is either not configured or released). Since the PUCCH resource for SR transmission and PRACH (Physical random access channel) resource may be configured by the base station in a periodic manner, the UE may wait for additional time for SR or PRACH transmission according to configured periodicity. We would like to notate such latency as SR_delay in this disclosure.

2. UL Grant Transmission

When the base station receives the SR from the UE, it shall transmit a UL grant to assign the time and frequency resource for UL transmission of RSTD message. The time between receiving the SR and transmitting UL grant (UL_grant_delay) is according to eNB implementation. The timing (scheduling_delay) between the UL grant transmission and corresponding UL transmission is 4 ms in LTE.

3. UL Transmission for RSTD Message

Based on above analysis, the low layer (PHY and MAC) latency for positioning service consists of at least "SR_delay", "UL_grant_delay", and "scheduling_delay" (from measured data generation to the RSTD report in UL). With stringent latency requirement in NR positioning, design to reduce these latencies (which are components of the whole positioning service latency) is required. In the most extreme case, it would be better the UE has the opportunity to report measured RSTD just after the measurement data being generated.

So how to reduce "SR_delay" and "scheduling_delay" for positioning measurement report in NR framework is the problem to be solved.

SUMMARY OF THE INVENTION

This disclosure introduces an enhanced measurement report mechanism for NR positioning, in order to reduce the latency of reporting positioning measurement in low layer (PHY and MAC). More specifically, the proposed idea is to minimize the latency between measurement report generation and measurement report transmission in NR positioning.

In one embodiment, an aspect of this disclosure relates to a method for transmitting positioning measurement report in a user equipment, wherein said method comprising:

receiving a location information request from a serving base station or from a location server;

determining timing for transmitting a positioning measurement report;

generating a report assisted message based on the determined timing for transmitting the positioning measurement report;

transmitting the report assisted message to the serving base station.

In another embodiment, an aspect of this disclosure relates to a method for reporting positioning measurement report in a base station, wherein said method comprising:

receiving a report assisted message from a user equipment;

assigning UL resource for positioning measurement report to the user equipment according to the received report assisted message.

In another embodiment, an aspect of this disclosure relates to a first apparatus for reporting positioning measurement report in a user equipment, comprising:

at least one processor; and at least one memory including computer program code;

the at least one memory and the computer program code configured to, with the at least one processor, cause the apparatus to perform:

receiving a location information request from a serving base station or from a location server;

determining timing for transmitting a positioning measurement report;

generating a report assisted message based on the determined timing for transmitting the positioning measurement report;

transmitting the report assisted message to the serving base station.

In another embodiment, an aspect of this disclosure relates to a second apparatus for reporting positioning measurement report in a base station, comprising:

at least one processor; and at least one memory including computer program code;

the at least one memory and the computer program code configured to, with the at least one processor, cause the apparatus to perform:

receiving a report assisted message from a user equipment;

assigning UL resource for positioning measurement report to the user equipment according to the received report assisted message.

In another embodiment, an aspect of this disclosure relates to a system for reporting positioning measurement report, wherein, the system comprises anyone of above first apparatus and anyone of above second apparatus.

In another embodiment, an aspect of this disclosure relates to a non-transitory computer-readable medium comprising computer instructions for causing an apparatus to perform at least:

receiving a location information request from a serving base station or from a location server;

determining timing for transmitting a positioning measurement report;

generating a report assisted message based on the determined timing for transmitting the positioning measurement report;

transmitting the report assisted message to the serving base station.

In another embodiment, an aspect of this disclosure relates to a non-transitory computer-readable medium comprising computer instructions for causing an apparatus to perform at least:

receiving a report assisted message from a user equipment;

assigning UL resource for positioning measurement report to the user equipment according to the received report assisted message.

The key idea of this disclosure is requesting UL resources for positioning measurement report in advance by transmitting a report assisted message. Consequently, the UE can transmit the positioning measurement report just after the measurement data being generated.

The proposed scheme is suitable to not only one-shot positioning measurement reporting but also periodic positioning measurement reporting. For one-shot positioning measurement report, the UE will indicate the expected transmit time of positioning measurement report in report assisted message. For periodic positioning measurement reporting, the UE can additionally request configured grant or SPS (Semi-persistence scheduling) transmission mode for positioning measurement report in report assisted message. In addition, the UE indicates the periodicity and offset of the report. The serving base station can hence allocate periodic UL resource to the UE for reporting positioning measurement periodically.

One implementation of proposed scheme could be OTDOA (observed time difference of arrival) positioning in NR system. In such implementation, our proposal is used to reduce the latency of the RSTD (reference signal time difference) report. Other implementations of proposed scheme could be other downlink positioning technologies in NR system.

The proposed idea can minimize the delay from positioning measurement data generation to the positioning measurement report. Short latency is required for many commercial use cases in NR positioning.

BRIEF DESCRIPTION OF THE DRAWINGS

Other features, purposes and advantages of the invention will become more explicit by means of reading the detailed statement of the non-restrictive embodiments made with reference to the accompanying drawings.

Figure 1:
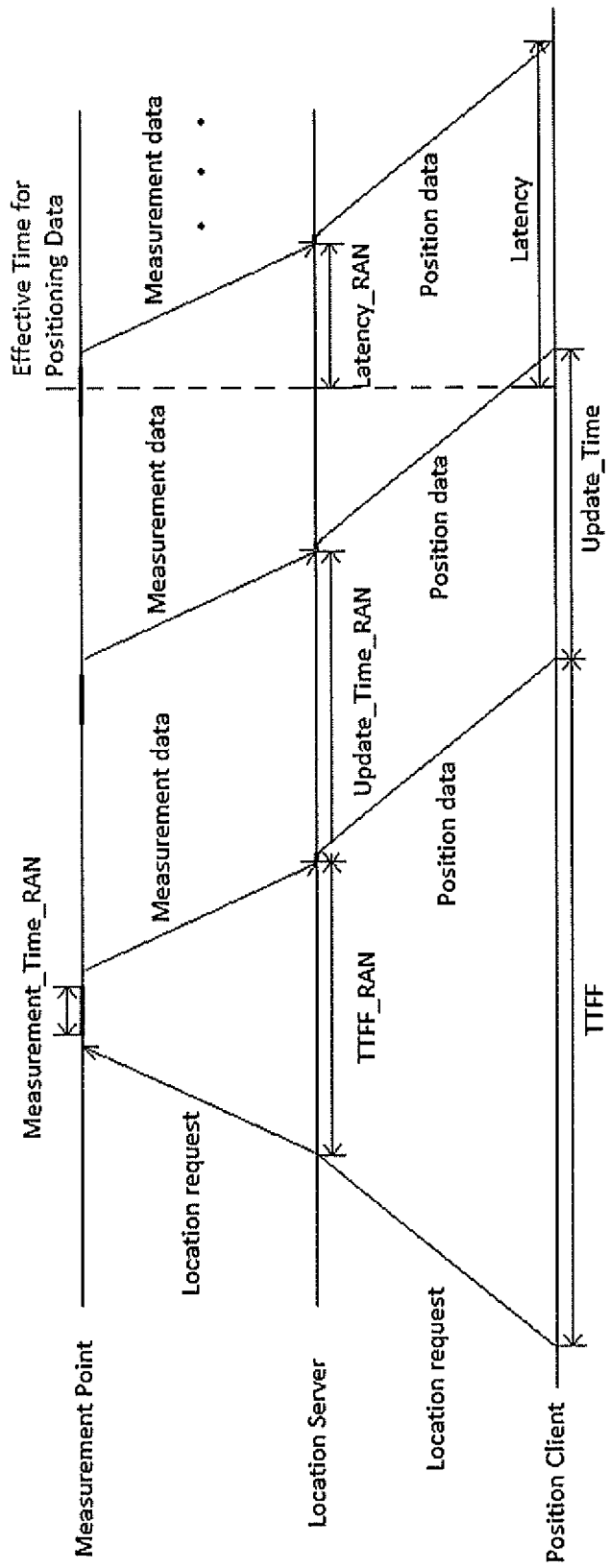
FIG. 1 shows time-related KPIs for NR positioning.
Figure 2:
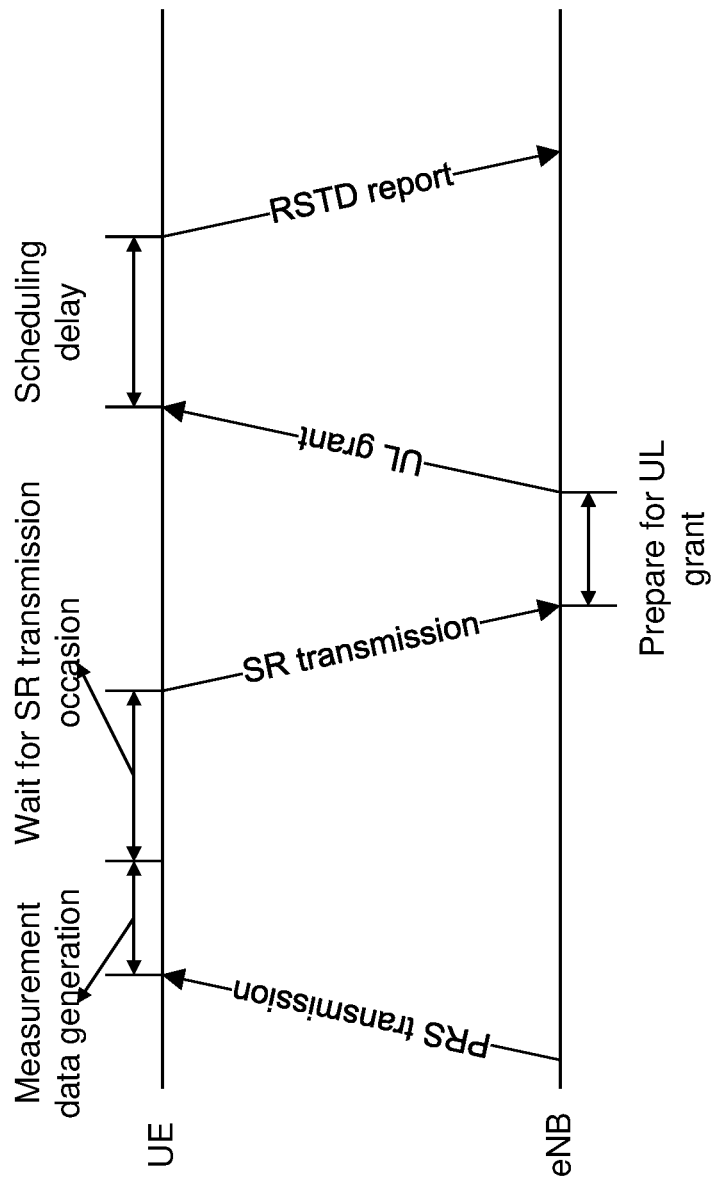
FIG. 2 shows RSTD report latency in LTE system.

The same or similar reference signs in the drawings represent the same or similar component parts.

DETAILED DESCRIPTION AND PREFERRED EMBODIMENT

The present disclosure will now be discussed in detail with regard to the attached drawing figures which are briefly described above. In the following description, numerous specific details are set forth illustrating the applicant's best mode for practicing the disclosure and enabling one of ordinary skill in the art of making and using the disclosure. It will be obvious, however, to one skilled in the art that the present disclosure may be practiced without many of these specific details. In other instances, well-known machines and method steps have not been described in particular detail in order to avoid unnecessarily obscuring the present disclosure. Unless otherwise indicated, like parts and method steps are referred to with like reference numerals.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, unless defined otherwise, all technical and scientific terms used herein have the same meaning as commonly understood by one of ordinary skills in the art to which this disclosure belongs. For example, the term "user equipment" used herein may refer to any terminal device or user equipment (UE) having wireless communication capabilities, including but not limited to, mobile phones, cellular phones, smart phones, or personal digital assistants (PDAs), portable computers, and the like. Furthermore, user equipment that is not mobile may also readily employ embodiments of the present invention. In the following description, the terms "user equipment", "UE" and "terminal device" may be used interchangeably. Similarly, the term "base station" may represent a base station (BS), a node B (NodeB or NB), an evolved NodeB (eNodeB or eNB), a gNodeB (gNB) and a relay node (RN), and so forth. The term "transmission point" may represent an apparatus for transmitting any information or data, including PRS signals.

For illustrative purposes, several embodiments of the present disclosure will be described in the context of a NR system. Those skilled in the art will appreciate, however, that the concept and principle of the several embodiments of the present disclosure may be more generally applicable to other wireless networks, for example a third generation Long Term Evolution (3G-LTE) network, a fourth generation (4G) network, 4.5G LTE, or a future network (e.g. 5G network).

Figure 3:
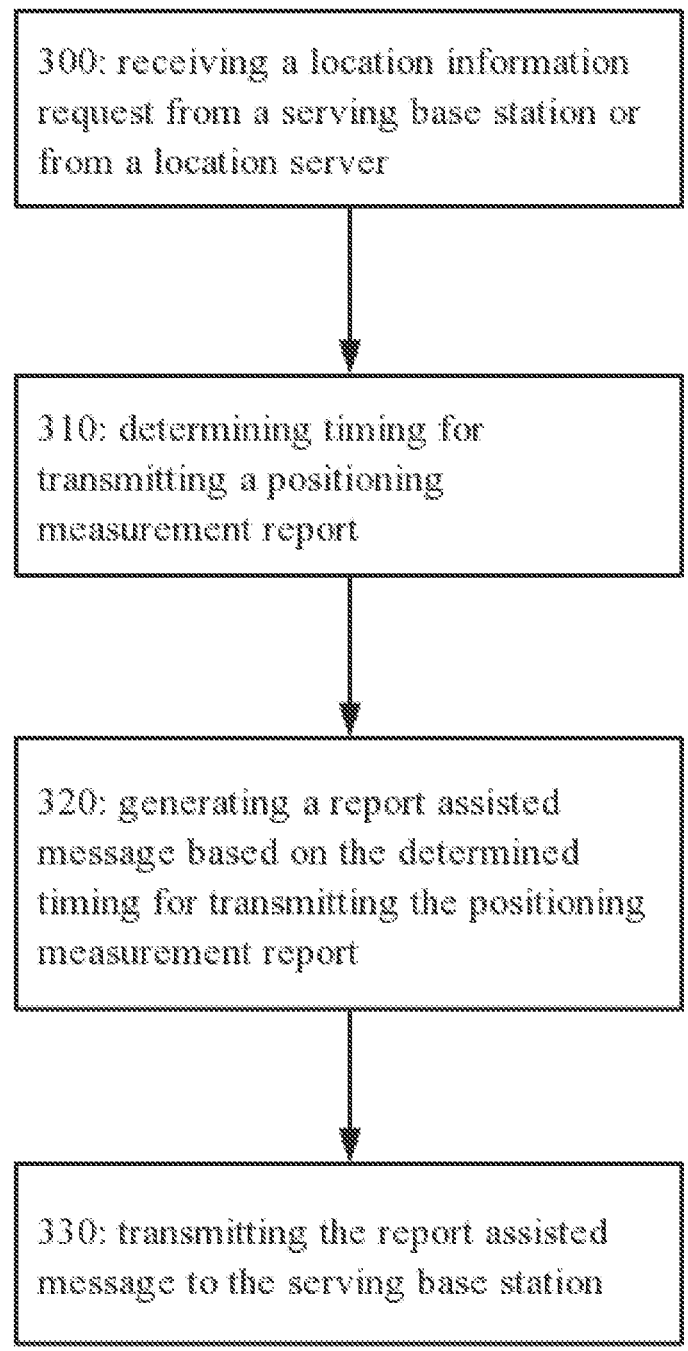
FIG. 3 shows a flow chart illustrating reporting positioning measurement report in a UE.

Referring to FIG. 3, an embodiment of a method for transmitting positioning measurement report in a UE (user equipment), comprising:

at step 300, receiving a location information request from a serving base station or from a location server;

at step 310, determining timing for transmitting a positioning measurement report;

at step 320, generating a report assisted message based on the determined timing for transmitting the positioning measurement report;

at step 330, transmitting the report assisted message to the serving base station.

Specifically, at step 300, the UE receives a location information request from a serving base station or from a location server, the location information request indicating the UE to provide location information. Besides the location information request, the location server indicates configurations of positioning reference signal transmitted from multiple transmission points.

At step 310, the UE determines timing for transmitting positioning measurement report. For example, the UE determines the transmit timing according to the information such as the UE's processing capability or other necessary information.

Preferably, at step 310, the UE determines the timing for transmitting positioning measurement report according to at least any one of:

request positioning accuracy;

the configuration of positioning reference signal; and the user equipment's processing capability.

For example, at step 310, the UE determines the timing for transmitting positioning measurement report according to the configuration of positioning reference signal received from the base station or from the location server.

Also, the UE determines the timing for transmitting positioning measurement report according to the other information such as request positioning accuracy and/or the UE's processing capability.

At step 320, the UE generates a report assisted message according to the timing for transmitting the positioning measurement report determined in step 310.

At step 330, the UE transmits the report assisted message to the serving base station to request resource for a UL transmission in advance, wherein the report assisted message facilitating positioning measurement.

Preferably, the report assisted message comprising at least any one of:

timing for transmitting the positioning measurement report;

estimated payload size of the positioning measurement report.

For example, the UE generates a report assisted message according to the timing for transmitting the positioning measurement report determined in step 310 and the estimated payload size of the positioning measurement report. Then, the serving base station can assign UL resource for positioning measurement report to the UE according to the received report assisted message.

Preferably, the timing for transmitting the positioning measurement report indicating at least one of:

one occasion for transmitting the positioning measurement report;

multiple periodic occasions for transmitting the positioning measurement report.

Specifically, the proposed scheme is suitable to not only one-shot positioning measurement reporting but also periodic positioning measurement reporting. For one-shot positioning measurement report, the UE will indicate the expected transmit time of positioning measurement report in report assisted message. For periodic positioning measurement reporting, the UE can additionally request configured grant or SPS (Semi-persistence scheduling) transmission mode for positioning measurement report in report assisted message.

Preferably, the report assisted message may further comprising:

request for configured grant transmission mode or semi-persistence scheduling transmission mode to report positioning measurement.

For example, the UE may transmit the positioning measurement report periodically, so the timing for transmitting the positioning measurement report may indicate multiple periodic occasions for transmitting the positioning measurement report. Therefore, the UE determines the timing for transmitting the positioning measurement report and the report periodicity.

For example, the UE generates a report assisted message according to the timing for transmitting the positioning measurement report, the estimated payload size of the positioning measurement report, request for configured grant transmission mode or semi-persistence scheduling transmission mode to report positioning measurement. In addition, the UE indicates the periodicity and offset of the report. Then the UE transmits the report assisted message to the serving base station. The serving base station can hence allocate periodic UL resource by configuring configured grant transmission mode or semi-persistence scheduling transmission mode to the UE for reporting positioning measurement periodically.

Those skilled in the art should understand that, the above-mentioned information included in the report assisted message is merely provided as an example, any existing or later possible information, if applicable to the present disclosure, should be also included within the protection scope of the present disclosure, and are hereby incorporated herein by reference.

Preferably, the UE transmits a scheduling request to the base station or initiates random access to request resource for a UL transmission; then the UE receives UL grant from the base station to schedule UL resource for transmitting the report assisted message; then the UE transmits the report assisted message in assigned UL resource to the base station.

Preferably, each occasion for transmitting the positioning measurement report further comprising multiple consecutive time resources.

As an embodiment, for each occasion for transmitting the positioning measurement report, the base station can allocate multiple consecutive time resources for transmitting the positioning measurement report to increase the transmission opportunity of the report. The base station can schedule contiguous slots, i.e., a time window, for positioning measurement report. This approach can increase the robustness of positioning measurement report, in case the report procedure is done in an unlicensed carrier or the UE has unclear measurement and processing capability.

Then, the UE receives UL grant from the serving base station to schedule UL resource for transmitting positioning measurement report.

For example, the serving base station assigns UL resource for positioning measurement report to the UE according to the received report assisted message. The UE receives UL grant from the serving base station to schedule UL resource for transmitting positioning measurement report. Then, the UE performs reference signal time difference measurement and generates the positioning measurement report. Subsequently, the UE transmits the positioning measurement report in assigned UL resource to the base station and then the positioning measurement report is further conveyed to the location server, for example, via LPP like protocol.

For example, when the timing for transmitting the positioning measurement report indicates multiple periodic occasions for transmitting the positioning measurement report, the UE determines the timing for transmitting the positioning measurement report, wherein the timing including the report periodicity. The UE generates a report assisted message according to the timing for transmitting the positioning measurement report, the estimated payload size of the positioning measurement report, and request for configured grant transmission mode or semi-persistence scheduling transmission mode to report positioning measurement, wherein the timing for transmitting the positioning measurement report including report periodicity. Then the UE transmits the report assisted message to the serving base station.

Therefore, the base station can assign UL resource by configuring configured grant transmission mode or semi-persistence scheduling transmission mode to the UE. The UE then receives periodic UL grant from the serving base station to schedule UL resource for reporting positioning measurement report periodically.

In another embodiment, an aspect of this disclosure relates to a method for transmitting positioning measurement report in a base station, wherein said method comprising:

receiving a report assisted message from a user equipment;

assigning UL resource for positioning measurement report to the user equipment according to the received report assisted message.

Specifically, the base station sends a location information request to a corresponding UE and then receives a report assisted message from the corresponding UE. Then the base station assigns UL resource for positioning measurement report to the UE according to the received report assisted message. Subsequently, the base station receives the positioning measurement report in assigned UL resource and then convey the positioning measurement report to the location server, for example, via LPP like protocol.

Here, when the base station interprets the received information as report assisted message, the base station shall assign UL resource for positioning measurement report accordingly.

Preferably, the report assisted message comprising at least any one of:

timing for reporting the positioning measurement report;
estimated payload size of the positioning measurement report.

The base station assigns UL resource for positioning measurement report to the UE according to the timing for transmitting the positioning measurement report and/or the estimated payload size of the positioning measurement report included in the received report assisted message.

Preferably, the timing for transmitting the positioning measurement report indicating at least one of:

one occasion for transmitting the positioning measurement report;
multiple periodic occasions for transmitting the positioning measurement report.

Specifically, the proposed scheme is suitable to not only one-shot positioning measurement reporting but also periodic positioning measurement reporting. For one-shot positioning measurement report, the UE will indicate the expected transmit time of positioning measurement report in report assisted message. For periodic positioning measurement reporting, the UE can additionally request configured grant or SPS (Semi-persistence scheduling) transmission mode for positioning measurement report in report assisted message.

Therefore, the report assisted message may further comprising:

request for configured grant transmission mode or semi-persistence scheduling transmission mode to report positioning measurement.

For example, the UE generates a report assisted message according to the timing for transmitting the positioning measurement report, the estimated payload size of the positioning measurement report, and request for configured grant transmission mode or semi-persistence scheduling transmission mode to report positioning measurement, wherein the timing including report periodicity. Then the UE transmits the report assisted message to the serving base station.

Therefore, the base station can assign UL resource by configuring configured grant transmission mode or semi-persistence scheduling transmission mode to the UE.

Preferably, assigning UL resource can be done by transmitting a UL grant to the UE. Preferably, when the timing for transmitting the positioning measurement report indicating multiple periodic occasions for transmitting the positioning measurement report, assigning UL resource can be done by configuring configured grant transmission mode or semi-persistence scheduling transmission mode to the UE.

Preferably, assigning UL resource may further comprising:

allocating multiple consecutive time resources for reporting the positioning measurement report.

As an embodiment, the base station can allocate multiple consecutive time resources for transmitting the positioning measurement report to increase the transmission opportunity of the report. The base station can schedule contiguous slots, i.e., a time window, for positioning measurement report. This approach can increase the robustness of positioning measurement report, in case the report procedure is done in an unlicensed carrier or the UE has unclear measurement and processing capability.

Figure 4:
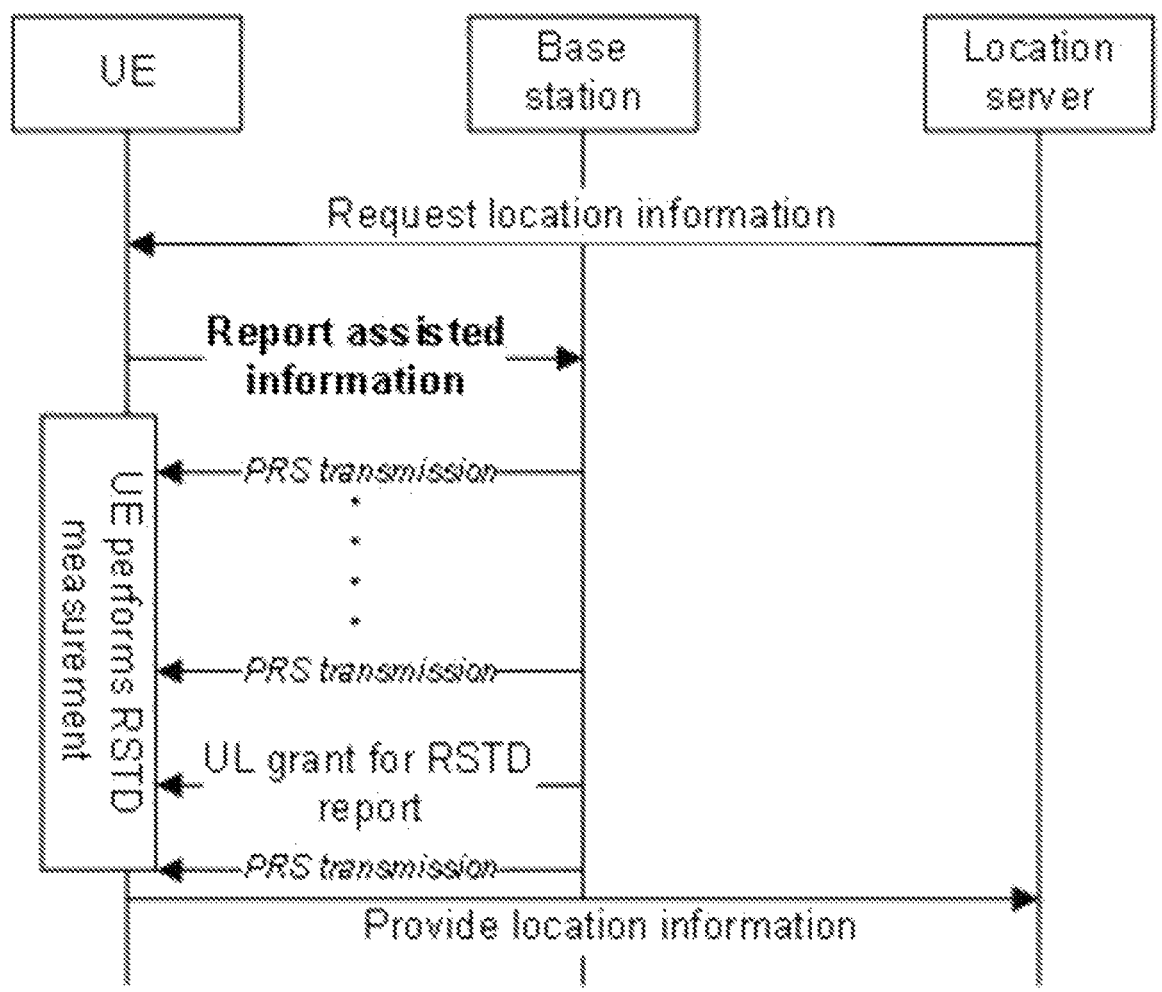
FIG. 4 shows the corresponding procedure of proposed report assisted message transmitted from the UE to the serving base station.

FIG. 4 shows the corresponding procedure of proposed report assisted message transmitted from the UE to the serving base station.

First, the serving base station indicates UE to provide location information by sending a location information request.

Then the UE transmits report assisted message to the base station to facilitate positioning measurement report. Herein, the report assisted message may include at least anyone of:

1. transmit timing for positioning measurement report.
   i. As an embodiment, the transmit timing can be a time offset from the report assisted message transmission to estimated positioning measurement report.
   ii. The transmit timing may indicate one or multiple periodic occasions for positioning measurement report. When the transmit timing indicates multiple periodic occasions for positioning measurement report, the transmit timing may include report periodicity.

2. Request for configured grant transmission mode or semi-persistence scheduling (SPS) transmission mode.
   UE can request configured grant UL transmission or SPS transmission for positioning measurement report, especially if the report will happen periodically.

3. Estimated payload size of the positioning measurement report.

4. Other information is not precluded.

Here, the report assisted message is encapsulated as a high layer message, for example a MAC or RRC (Radio Resource Control) message.

Then, the serving base station transmits a UL grant to the UE schedule UL resource for the positioning measurement report according to received report assisted message.

Then, the positioning measurement report is transmitted from the UE to the base station and further conveyed to the location server, for example, via LPP like protocol.

Figure 5:
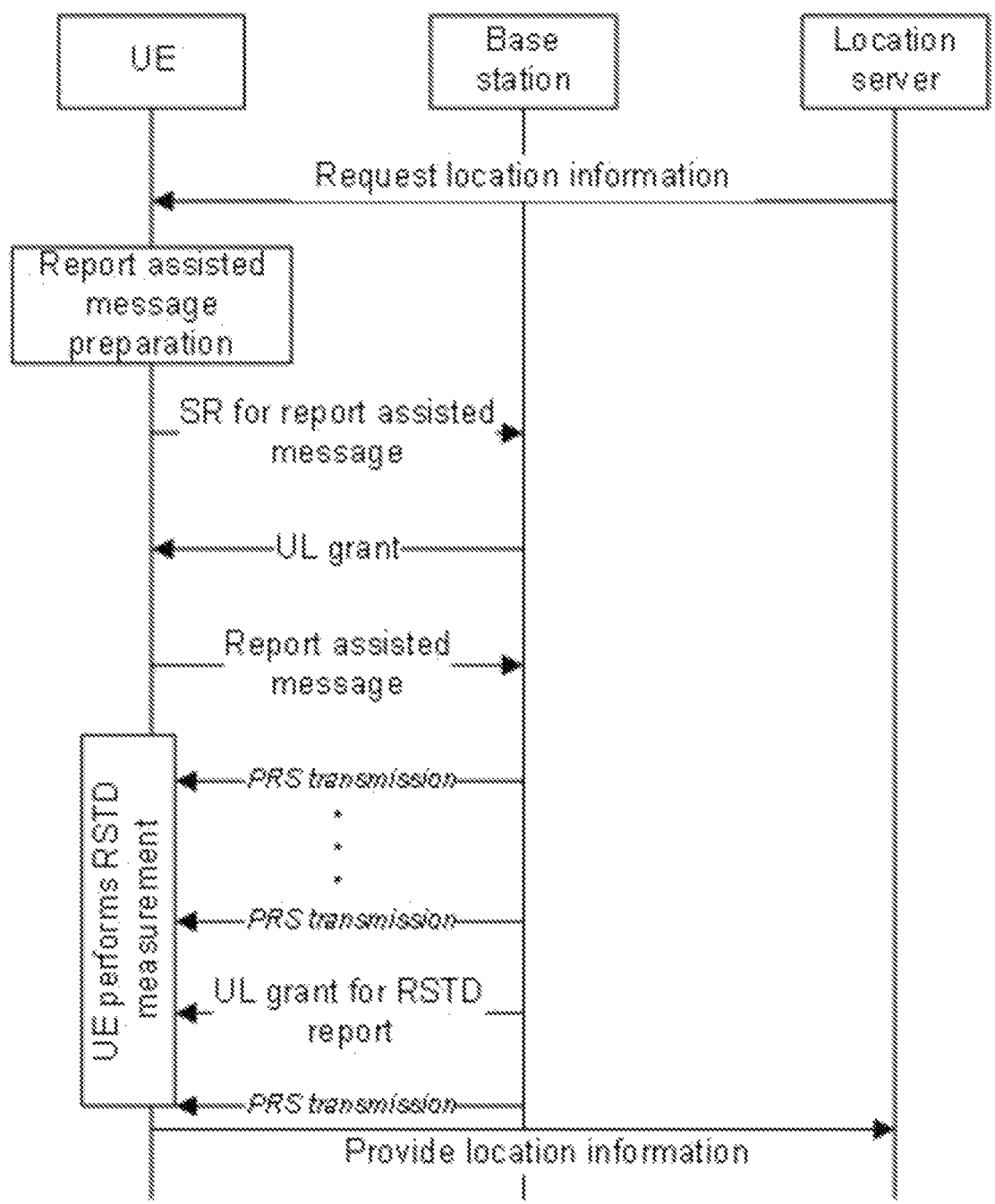
FIG. 5 shows the detailed procedure of transmitting positioning measurement report from the UE to the serving base station.

FIG. 5 shows the detailed procedure of transmitting positioning measurement report from the UE to the serving base station.

At the UE side, the detailed procedure of proposed mechanism includes the following steps and illustrated in FIG. 5.

Step 1: Receiving location information request.

A UE may receive a request from location server or directly from serving base station to provide location information.

Step 2: Preparing report assisted message.

The UE estimates transmit timing for positioning measurement report. The estimation is based on the request positioning accuracy, the configuration of positioning reference signal, and UE's processing capability. Then, the UE prepares a report assisted message accordingly. Within the report assisted message, the UE shall indicate one or multiple periodic transmit timing, request for configured grant or SPS transmission mode for positioning measurement report, and expected report periodicity and offset.

Step 3: Transmitting report assisted message.

When the UE receives the location information request, the UE will transmit a report assisted message to the serving base station. This message may trigger scheduling request procedure. If so, UE has the following sub-steps to transmit report assisted message:

Step 3.1: scheduling request procedure.

The UE transmits a SR to the base station or initiates random access to request resource for a UL transmission.

Step 3.2: Receiving UL grant.

After SR transmission, the UE shall expect a UL grant to schedule the transmission of report assisted message.

Step 3.3: Transmitting report assisted message.

The UE transmits report assisted message in assigned UL resource.

Step 4: Measuring positioning reference signal.

The UE measures positioning reference signal according to configuration received from the location server.

Step 5: Receiving UL grant for measurement report.

The UE expects a UL grant for positioning measurement report. The base station will schedule the transmission of positioning measurement report according to received assisted message.

Step 6: Reporting the positioning measurement report.

Positioning measurement report is transmitted from the UE to the base station and further conveyed to the location server, for example, via LPP like protocol.

In another embodiment, an aspect of this disclosure relates to a first apparatus for reporting positioning measurement report in a user equipment, comprising:

means 600 (not shown) for receiving a location information request from a serving base station or from a location server;

means 610 (not shown) for determining timing for transmitting a positioning measurement report;

means 620 (not shown) for generating a report assisted message based on the determined timing for transmitting the positioning measurement report;

means 630 (not shown) for transmitting the report assisted message to the serving base station.

Specifically, means 600 in the UE receives a location information request from a serving base station or from a location server, the location information request indicating the UE to provide location information. Besides the location information request, the location server indicates configurations of positioning reference signal transmitted from multiple transmission points.

Means 610 in the UE determines timing for transmitting positioning measurement report. For example, the UE determines the transmit timing according to the information such as the UE's processing capability or other necessary information.

Preferably, means 610 in the UE determines the timing for transmitting positioning measurement report according to at least any one of:

request positioning accuracy;

the configuration of positioning reference signal; and the user equipment's processing capability.

For example, means 610 in the UE determines the timing for transmitting positioning measurement report according to the configuration of positioning reference signal received from the base station or from the location server.

Also, the UE determines the timing for transmitting positioning measurement report according to the other information such as request positioning accuracy and/or the UE's processing capability.

Means 620 in the UE generates a report assisted message according to the timing for transmitting the positioning measurement report determined by the means 610.

Means 630 in the UE transmits the report assisted message to the serving base station to request resource for a UL transmission in advance, wherein the report assisted message facilitating positioning measurement.

Preferably, the report assisted message comprising at least any one of:
- timing for transmitting the positioning measurement report;
- estimated payload size of the positioning measurement report.

For example, the UE generates a report assisted message according to the timing for transmitting the positioning measurement report determined by the means 610 and the estimated payload size of the positioning measurement report. Then, the serving base station can assign UL resource for positioning measurement report to the UE according to the received report assisted message.

Preferably, the timing for transmitting the positioning measurement report indicating at least one of:
- one occasion for transmitting the positioning measurement report;
- multiple periodic occasions for transmitting the positioning measurement report.

Specifically, the proposed scheme is suitable to not only one-shot positioning measurement reporting but also periodic positioning measurement reporting. For one-shot positioning measurement report, the UE will indicate the expected transmit time of positioning measurement report in report assisted message. For periodic positioning measurement reporting, the UE can additionally request configured grant or SPS (Semi-persistence scheduling) transmission mode for positioning measurement report in report assisted message.

Preferably, the report assisted message may further comprising:
- request for configured grant transmission mode or semi-persistence scheduling transmission mode to report positioning measurement.

For example, the UE may transmit the positioning measurement report periodically, so the timing for transmitting the positioning measurement report may indicate multiple periodic occasions for transmitting the positioning measurement report. Therefore, the UE determines the timing for transmitting the positioning measurement report and the report periodicity.

For example, the UE generates a report assisted message according to the timing for transmitting the positioning measurement report, the estimated payload size of the positioning measurement report, request for configured grant transmission mode or semi-persistence scheduling transmission mode to report positioning measurement. In addition, the UE indicates the periodicity and offset of the report. Then the UE transmits the report assisted message to the serving base station. The serving base station can hence allocate periodic UL resource by configuring configured grant transmission mode or semi-persistence scheduling transmission mode to the UE for reporting positioning measurement periodically.

Those skilled in the art should understand that, the above-mentioned information included in the report assisted message is merely provided as an example, any existing or later possible information, if applicable to the present disclosure, should be also included within the protection scope of the present disclosure, and are hereby incorporated herein by reference.

Preferably, the UE transmits a scheduling request to the base station or initiates random access to request resource for a UL transmission; then the UE receives UL grant from the base station to schedule UL resource for transmitting the report assisted message; then the UE transmits the report assisted message in assigned UL resource to the base station.

Preferably, each occasion for transmitting the positioning measurement report further comprising multiple consecutive time resources.

As an embodiment, for each occasion for transmitting the positioning measurement report, the base station can allocate multiple consecutive time resources for transmitting the positioning measurement report to increase the transmission opportunity of the report. The base station can schedule contiguous slots, i.e., a time window, for positioning measurement report. This approach can increase the robustness of positioning measurement report, in case the report procedure is done in an unlicensed carrier or the UE has unclear measurement and processing capability.

Then, the UE receives UL grant from the serving base station to schedule UL resource for transmitting positioning measurement report.

For example, the serving base station assigns UL resource for positioning measurement report to the UE according to the received report assisted message. The UE receives UL grant from the serving base station to schedule UL resource for transmitting positioning measurement report. Then, the UE performs reference signal time difference measurement and generates the positioning measurement report. Subsequently, the UE transmits the positioning measurement report in assigned UL resource to the base station and then the positioning measurement report is further conveyed to the location server, for example, via LPP like protocol.

For example, when the timing for transmitting the positioning measurement report indicates multiple periodic occasions for transmitting the positioning measurement report, the UE determines the timing for transmitting the positioning measurement report, wherein the timing including the report periodicity. The UE generates a report assisted message according to the timing for transmitting the positioning measurement report, the estimated payload size of the positioning measurement report, and request for configured grant transmission mode or semi-persistence scheduling transmission mode to report positioning measurement, wherein the timing for transmitting the positioning measurement report including report periodicity. Then the UE transmits the report assisted message to the serving base station.

Therefore, the base station can assign UL resource by configuring configured grant transmission mode or semi-persistence scheduling transmission mode to the UE. The UE then receives periodic UL grant from the serving base station to schedule UL resource for reporting positioning measurement report periodically.

Herein, the means preceding comprises:
- at least one processor; and
- at least one memory including computer program code, that at least one memory and computer program code configured to, with the at least one processor, cause the performance of the apparatus.

In another embodiment, an aspect of this disclosure relates to a second apparatus for reporting positioning measurement report in a base station, comprising:
  means 700 (not shown) for receiving a report assisted message from a user equipment;
  means 710 (not shown) for assigning UL resource for positioning measurement report to the user equipment according to the received report assisted message.

Specifically, the base station sends a location information request to a corresponding UE and then, the means 700 in the base station receives a report assisted message from the corresponding UE. Then the means 710 in the base station assigns UL resource for positioning measurement report to the UE according to the received report assisted message. Subsequently, the base station receives the positioning measurement report in assigned UL resource and then convey the positioning measurement report to the location server, for example, via LPP like protocol.

Here, when the base station interprets the received information as report assisted message, the base station shall assign UL resource for positioning measurement report accordingly.

Preferably, the report assisted message comprising at least any one of:
  timing for reporting the positioning measurement report;
  estimated payload size of the positioning measurement report.

The means 710 in the base station assigns UL resource for positioning measurement report to the UE according to the timing for transmitting the positioning measurement report and/or the estimated payload size of the positioning measurement report included in the received report assisted message.

Preferably, the timing for transmitting the positioning measurement report indicating at least one of:
  one occasion for transmitting the positioning measurement report;
  multiple periodic occasions for transmitting the positioning measurement report.

Specifically, the proposed scheme is suitable to not only one-shot positioning measurement reporting but also periodic positioning measurement reporting. For one-shot positioning measurement report, the UE will indicate the expected transmit time of positioning measurement report in report assisted message. For periodic positioning measurement reporting, the UE can additionally request configured grant or SPS (Semi-persistence scheduling) transmission mode for positioning measurement report in report assisted message.

Therefore, the report assisted message may further comprising:
  request for configured grant transmission mode or semi-persistence scheduling transmission mode to report positioning measurement.

For example, the UE generates a report assisted message according to the timing for transmitting the positioning measurement report, the estimated payload size of the positioning measurement report, and request for configured grant transmission mode or semi-persistence scheduling transmission mode to report positioning measurement, wherein the timing including report periodicity. Then the UE transmits the report assisted message to the serving base station.

Therefore, the base station can assign UL resource by configuring configured grant transmission mode or semi-persistence scheduling transmission mode to the UE.

Preferably, assigning UL resource can be done by transmitting a UL grant to the UE. Preferably, when the timing for transmitting the positioning measurement report indicating multiple periodic occasions for transmitting the positioning measurement report, assigning UL resource can be done by configuring configured grant transmission mode or semi-persistence scheduling transmission mode to the UE.

Preferably, assigning UL resource may further comprising:
  allocating multiple consecutive time resources for reporting the positioning measurement report.

As an embodiment, the base station can allocate multiple consecutive time resources for transmitting the positioning measurement report to increase the transmission opportunity of the report. The base station can schedule contiguous slots, i.e., a time window, for positioning measurement report. This approach can increase the robustness of positioning measurement report, in case the report procedure is done in an unlicensed carrier or the UE has unclear measurement and processing capability.

Herein, the means preceding comprises:
  at least one processor; and
  at least one memory including computer program code, that at least one memory and computer program code configured to, with the at least one processor, cause the performance of the apparatus.

In another embodiment, an aspect of this disclosure relates to a system for reporting positioning measurement report, wherein, the system comprises anyone of above first apparatus and anyone of above second apparatus.

Also, a non-transitory computer-readable medium comprising computer instructions for causing an apparatus to perform at least:
  receiving historic measurement data collected from radio access nodes, wherein, the measurement data comprises SINR and related measurements;
  training one or more prediction models with the historic measurement data based on one or more neutral networks.

And, a non-transitory computer-readable medium comprising computer instructions for causing an apparatus to perform at least:
  receiving historic measurement data collected from radio access nodes, wherein, the measurement data comprises SINR and related measurements;
  obtaining one or more prediction models based on one or more neutral networks;
  predicting SINR with the prediction models and the historic measurement data;
  sending the predicting SINR to one or more link adaptation modules in cellular network.

For a person skilled in the art, it is apparent that the present disclosure is not limited to the details of the above exemplary embodiments, and the present disclosure can be implemented in other specific forms without departing from the spirit or essential characteristics of the present disclosure. Therefore, the embodiments should be regarded as exemplarily and not restrictive, and the scope of the present disclosure is defined by the appended claims rather than the above description, and therefore it is intended that the claims All changes that come within the meaning and range of equivalency of the disclosure are encompassed by the disclosure. Any reference signs in the claims should not be regarded as limiting the involved clauses. In addition, it is clear that the word "comprising" does not exclude other units or steps, and the singular does not exclude the plural. The multiple units or devices recited in the system claims may also be implemented by one unit or device through software or hardware. Words such as first, second, etc., are used to indicate a name and do not indicate any specific order.

Aspects of various embodiments are specified in the claims. Those and other aspects of various embodiments are specified in the following numbered clauses:

1. A method for transmitting positioning measurement report in a user equipment, wherein said method comprising:
   receiving a location information request from a serving base station or from a location server;
   determining timing for transmitting a positioning measurement report;
   generating a report assisted message based on the determined timing for transmitting the positioning measurement report;
   transmitting the report assisted message to the serving base station.

2. The method of clause 1, wherein the timing for transmitting positioning measurement report is determined based on at least any one of:
   request positioning accuracy;
   the configuration of positioning reference signal; and
   the user equipment's processing capability.

3. The method of clause 1, wherein the report assisted message comprising at least:
   timing for transmitting the positioning measurement report;
   estimated payload size of the positioning measurement report.

4. The method of clause 1, wherein the report assisted message further comprising:
   request for configured grant transmission mode or semi-persistence scheduling transmission mode to report positioning measurement.

5. The method of clause 3, wherein the timing for transmitting the positioning measurement report indicating at least one of:
   one occasion for transmitting the positioning measurement report;
   multiple periodic occasions for transmitting the positioning measurement report.

6. The method of clause 5, wherein each occasion for transmitting the positioning measurement report further comprising multiple consecutive time resources.

7. A method for transmitting positioning measurement report in a base station, wherein said method comprising:
   receiving a report assisted message from a user equipment;
   assigning UL resource for positioning measurement report to the user equipment according to the received report assisted message.

8. The method of clause 7, wherein the report assisted message comprising at least:
   timing for transmitting the positioning measurement report;
   estimated payload size of the positioning measurement report.

9. The method of clause 8, wherein the timing for transmitting the positioning measurement report indicating at least one of:
   one occasion for transmitting the positioning measurement report;
   multiple periodic occasions for transmitting the positioning measurement report.

10. The method of anyone of clauses 7 to 9, wherein assigning UL resource can be done by transmitting a UL grant to the user equipment.

11. The method of clauses 10, wherein assigning UL resource can be done by configuring configured grant transmission mode or semi-persistence scheduling transmission mode to the user equipment.

12. The method of clause 7 to 9, wherein assigning UL resource further comprising:
    allocating multiple consecutive time resources for reporting the positioning measurement report.

13. A first apparatus for transmitting positioning measurement report in a user equipment, comprising:
    means for receiving a location information request from a serving base station or from a location server;
    means for determining timing for transmitting a positioning measurement report;
    means for generating a report assisted message based on the determined timing for transmitting the positioning measurement report;
    means for transmitting the report assisted message to the serving base station.

14. The apparatus of clause 13, wherein the timing for transmitting positioning measurement report is determined based on at least any one of:
    request positioning accuracy;
    the configuration of positioning reference signal; and
    the user equipment's processing capability.

15. The apparatus of clause 13, wherein the report assisted message comprising at least:
    timing for transmitting the positioning measurement report;
    estimated payload size of the positioning measurement report.

16. The apparatus of clause 13, wherein the report assisted message further comprising:
    request for configured grant transmission mode or semi-persistence scheduling transmission mode to report positioning measurement.

17. The apparatus of clause 15, wherein the timing for transmitting the positioning measurement report indicating at least one of:
    one occasion for transmitting the positioning measurement report;
    multiple periodic occasions for transmitting the positioning measurement report.

18. The apparatus of clause 17, wherein each occasion for transmitting the positioning measurement report further comprising multiple consecutive time resources.

19. The apparatus of anyone of clauses 13 to 18, wherein the means comprising:
    at least one processor; and
    at least one memory including computer program code, that at least one memory and computer program code configured to, with the at least one processor, cause the performance of the apparatus.

20. A second apparatus for transmitting positioning measurement report in a base station, comprising:
    means for receiving a report assisted message from a user equipment;
    means for assigning UL resource for positioning measurement report to the user equipment according to the received report assisted message.

21. The apparatus of clause 20, wherein the report assisted message comprising at least:
  timing for transmitting the positioning measurement report;
  estimated payload size of the positioning measurement report.

22. The apparatus of clause 21, wherein the timing for transmitting the positioning measurement report indicating at least one of:
  one occasion for transmitting the positioning measurement report;
  multiple periodic occasions for transmitting the positioning measurement report.

23. The apparatus of anyone of clauses 20 to 22, wherein assigning UL resource can be done by transmitting a UL grant to the user equipment.

24. The apparatus of clauses 23, wherein assigning UL resource can be done by configuring configured grant transmission mode or semi-persistence scheduling transmission mode to the user equipment.

25. The apparatus of anyone of clauses 20 to 22, wherein assigning UL resource further comprising:
  allocating multiple consecutive time resources for reporting the positioning measurement report.

26. The apparatus of anyone of clauses 20 to 25, wherein the means comprising:
  at least one processor; and
  at least one memory including computer program code, that at least one memory and the computer program code configured to, with the at least one processor, cause the performance of the apparatus.

27. A system for reporting positioning measurement report, wherein, the system comprises a first apparatus of anyone of clauses 13 to 10 and a second apparatus of anyone of clauses 20 to 26.

28. A non-transitory computer-readable medium comprising computer instructions for causing an apparatus to perform at least:
  receiving a location information request from a serving base station or from a location server;
  determining timing for transmitting a positioning measurement report;
  generating a report assisted message based on the determined timing for transmitting the positioning measurement report;
  transmitting the report assisted message to the serving base station.

29. A non-transitory computer-readable medium comprising computer instructions for causing an apparatus to perform at least:
  receiving a report assisted message from a user equipment;
  assigning UL resource for positioning measurement report to the user equipment according to the received report assisted message.

It needs to note that the present disclosure can be implemented in software and/or a combination of software and hardware, for example, the disclosure can be implemented by using an Application Specific Integrated Circuit (ASIC), a general purpose computer or any other similar hardware equipment. In one embodiment, the software program of this disclosure can be executed by a processor to accomplish the aforesaid steps or functions. Likewise, the software program (including the relevant data structure) of the disclosure can be stored in a computer readable recording medium, for example, RAM memory, magneto-optical drive or floppy disk and similar devices. In addition, some steps or functions of the disclosure can be realized by using hardware, for example, a circuit that cooperates with the processor to perform various kind of steps or functions.

In addition, part of the disclosure can be applied as a computer program product, such as a computer program instruction, when the instruction is executed by the computer, the method and/or technical solution according to this disclosure may be called or provided through an operation of the computer. However, the program instruction for calling the method of the disclosure may possibly be stored in a fixed or movable recording medium, and/or be transmitted via broadcasting or other signal carrier mediums, and/or be stored in the operation memory of a computer device that is running according to said program instruction. Here, there is one device included according to an embodiment of the disclosure, said device comprises a memory for storing computer program instructions and a processor for executing program instructions, this device is triggered to operate the methods and/or technical solutions based on the aforesaid embodiments of the disclosure when the computer program instructions are executed by said processor.

To those skilled in the art, apparently the present disclosure is not limited to the details of the aforementioned exemplary embodiments, moreover, under the premise of not deviating from the spirit or fundamental characteristics of the disclosure, this disclosure can be accomplished in other specific forms. Therefore, the embodiments should be considered exemplary and non-restrictive no matter from which point, the scope of the disclosure is defined by the appended claims instead of the above description, and aims at covering the meanings of the equivalent components falling into the claims and all changes within the scope in this disclosure. Any reference sign in the claims shall not be deemed as limiting the concerned claims. Besides, apparently the word "comprise/include" does not exclude other components or steps, singular numbers does not exclude complex numbers, the plurality of components or means mentioned in device claims may also be accomplished by one component or means through software or hardware, the wording like first and second are only used to represent names rather than any specific order.

The invention claimed is:

1. A method for transmitting a positioning measurement report in a user equipment, wherein said method comprising:
  receiving a location information request from a serving base station or from a location server;
  determining timing for transmitting the positioning measurement report;
  generating a report assisted message based on the determined timing for transmitting the positioning measurement report;
  transmitting the report assisted message to the serving base station.

2. The method of claim 1, wherein the timing for transmitting the positioning measurement report is determined based on at least any one of:
  request positioning accuracy;
  the configuration of positioning reference signal; or
  the user equipment's processing capability.

3. The method of claim 1, wherein the report assisted message comprising at least:
  timing for transmitting the positioning measurement report; estimated payload size of the positioning measurement report.

4. The method of claim 1, wherein the report assisted message further comprising:
   request for configured grant transmission mode or semi-persistence scheduling transmission mode to report positioning measurement.

5. The method of claim 3, wherein the timing for transmitting the positioning measurement report indicating at least one of:
   one occasion for transmitting the positioning measurement report;
   multiple periodic occasions for transmitting the positioning measurement report.

6. The method of claim 5, wherein each occasion for transmitting the positioning measurement report further comprising multiple consecutive time resources.

7. A first apparatus for transmitting a positioning measurement report in a user equipment, comprising:
   at least one processor; and
   at least one non-transitory memory including computer program code;
   the at least one memory and the computer program code configured to, with the at least one processor, cause the apparatus to perform:
      receiving a location information request from a serving base station or from a location server;
      determining timing for transmitting the positioning measurement report;
      generating a report assisted message based on the determined timing for transmitting the positioning measurement report;
      transmitting the report assisted message to the serving base station.

8. The apparatus of claim 7, wherein the timing for transmitting the positioning measurement report is determined based on at least any one of:
   request positioning accuracy;
   the configuration of positioning reference signal; and
   the user equipment's processing capability.

9. The apparatus of claim 7, wherein the report assisted message comprising at least:
   timing for transmitting the positioning measurement report;
   estimated payload size of the positioning measurement report.

10. The apparatus of claim 7, wherein the report assisted message further comprising:
    request for configured grant transmission mode or semi-persistence scheduling transmission mode to report positioning measurement.

11. The apparatus of claim 9, wherein the timing for transmitting the positioning measurement report indicating at least one of:
    one occasion for transmitting the positioning measurement report;
    multiple periodic occasions for transmitting the positioning measurement report.

12. The apparatus of claim 11, wherein each occasion for transmitting the positioning measurement report further comprising multiple consecutive time resources.

13. A system for reporting a positioning measurement report, wherein, the system comprises a first apparatus as claimed in claim 7 and a second apparatus for transmitting the positioning measurement report in the base station, comprising:
    at least one second processor; and
    at least one second non-transitory memory including second computer program code;
    the at least one second memory and the second computer program code configured to, with the at least one second processor, cause the second apparatus to perform:
       receiving the report assisted message from the user equipment;
       assigning UL resource for the positioning measurement report to the user equipment according to the received report assisted message.

14. A non-transitory computer-readable medium comprising computer instructions for causing an apparatus to perform at least:
    receiving a location information request from a serving base station or from a location server;
    determining timing for transmitting a positioning measurement report;
    generating a report assisted message based on the determined timing for transmitting the positioning measurement report;
    transmitting the report assisted message to the serving base station.

* * * * *